Dec. 25, 1934.  L. E. HUDGENS  1,985,451
LEVEL INDICATOR AND FLOW REGULATOR
Original Filed March 5, 1931   2 Sheets-Sheet 1
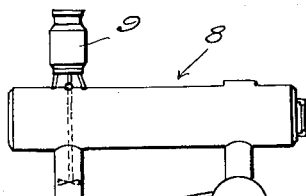
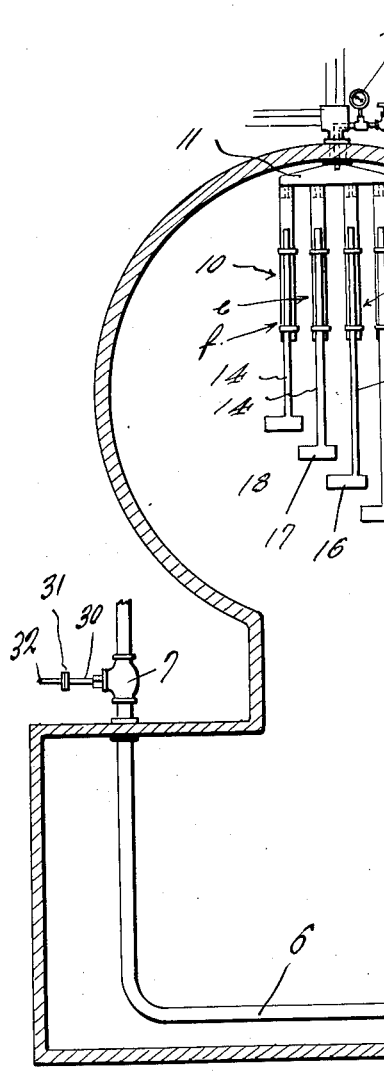
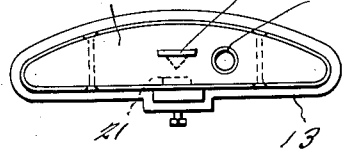
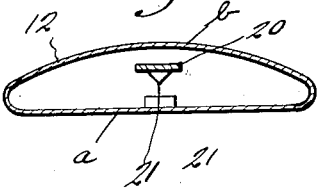
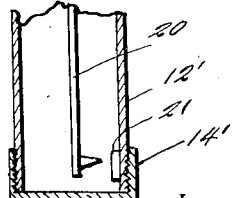
Inventor
L. E. Hudgens
By Clarence A. O'Brien
Attorney Dec. 25, 1934.  L. E. HUDGENS  1,985,451
LEVEL INDICATOR AND FLOW REGULATOR
Original Filed March 5, 1931  2 Sheets-Sheet 2
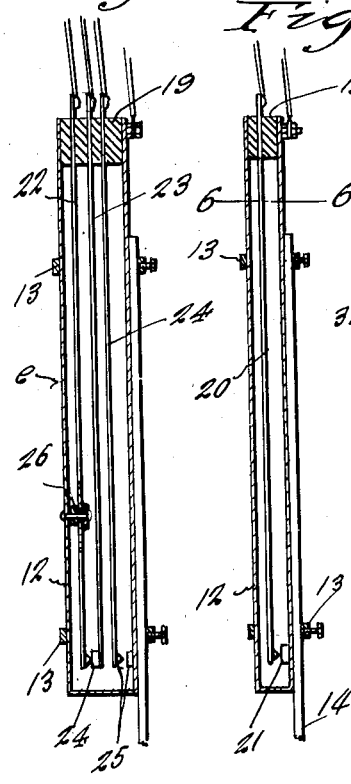
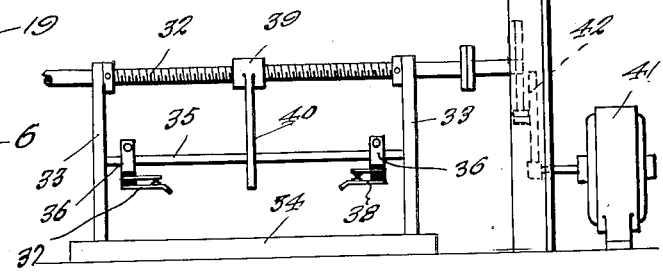
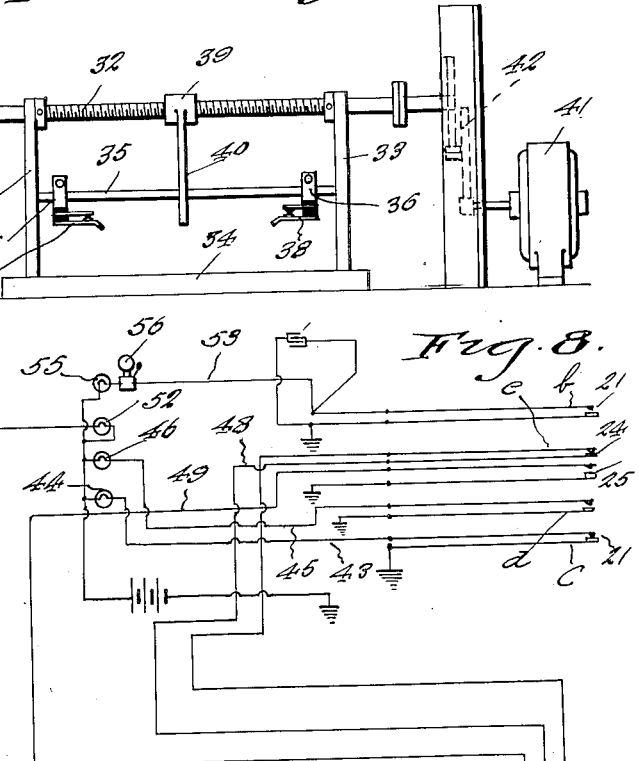
Inventor
L. E. Hudgens
By Clarence A. O'Brien
Attorney Patented Dec. 25, 1934

1,985,451

UNITED STATES PATENT OFFICE 1,985,451

LEVEL INDICATOR AND FLOW REGULATOR

Luther E. Hudgens, Wichita Falls, Tex.

Application March 5, 1931, Serial No. 520,412
Renewed May 19, 1934

2 Claims. (Cl. 200—81)

This invention relates to improvements in means for indicating liquid level and regulating the flow thereof, and is an improvement on my co-pending application, Serial No. 499,768 filed December 3, 1930.

The principal object of this invention over my co-pending application Serial No. 499,768 is to provide a level indicator and flow regulator wherein the electrical contacts are thoroughly insulated and protected from the liquid.

Another important object of the invention is to provide novel switch means for turning on or off the regulator motor.

During the course of the following specification and claims, other objects will become apparent to the reader.

In the drawings:—

Figure 1 represents a side elevational view of the still of the type in which the present invention is installed.

Fig. 2 represents a vertical sectional view through the still showing the switch means installed therein.

Fig. 3 represents a vertical sectional view through the switching unit for operating a signal light and the float control valve.

Fig. 4 represents a vertical sectional view through one of the indicator switches.

Fig. 5 represents a top plan view of one of the switch units shown in Fig. 4.

Fig. 6 represents a cross sectional view taken substantially on the line 6—6 of Fig. 4.

Fig. 7 represents a side elevational view of the regulator motor controlling switch.

Fig. 8 represents a diagrammatic view disclosing the electrical connections between the electrical devices involved.

Fig. 9 is a fragmentary side elevational view of a modification of one of the shells such as are shown in Figs. 3 and 4.

Fig. 10 represents a fragmentary detailed sectional view of the lower end of the modified shell shown in Fig. 9.

Referring to the drawings, wherein like numerals designate like parts, it can be seen that numeral 5 represents generally a still, numeral 6 represents the draw-off line extending into the same, and having the valve 7 interposed therein.

In stills of this kind, the first operation is to charge the still to the proper oil level, then start the agitator motor 9, which causes oil to flow thru the still. Numeral 10 generally refers to the switch unit which indicates the level and controls the flow of oil and which forms the subject matter in part of the present invention.

Numeral 11 represents the hollow header from which depends four hollow shells 12, each being provided with a substantially plane side $a$, and a transversely curved side $b$, each of said shells being of narrow width and being of highly flexible sheet metal construction.

These contact units are generally referred to by $c$, $d$, $e$, and $f$. Secured to the plane side of each of the shells 12 by clamp bands 13, is an elongated depending stem. The stem of each unit is denoted by numeral 14 and as is apparent in Fig. 2, the stem on the unit $c$ is substantially longer than the stem on the unit $d$; the stem on the unit $d$ being substantially longer than the stem on the unit $e$ and the stem on the unit $e$ being substantially longer than the stem on the unit $f$.

On the lower ends of the stems of the units $c$, $d$, $e$, and $f$, are the paddles 15, 16, 17 and 18 respectively.

It is to be understood that the material of which the shells 12 are constructed are highly flexible so that the shells will readily give. Within the upper end of each shell is a di-electric plug 19 and from this plug 19 is the unit $d$, $e$ and $f$, a relatively stiff contact finger 20 depends and terminates opposite a contact 21 on the plane side of the shell 12.

Normally, finger 20 is spaced from the contact 21, but when the shell 12 is distorted by the flow of oil against the paddle on the corresponding stem 14, the contact 21 is in engagement with the finger 20.

However, the shell 12 in the unit $e$ is substantially wider than the other shells and from the di-electric plug 19 in the upper end thereof, there depends the fingers 22, 23 and 24. The fingers 22 and 23 are provided with contacts 24 which are normally in engagement, while the contacts 25 (one on the finger 24 and the other on the shell 12) are spaced apart.

It will also be observed that the finger 22 is secured to the shell 12 at 26 so that the finger 22 will move with the shell 12 in the same manner as will the contact 25 on the shell.

It can be seen in Fig. 2, that numeral 27 represents a compressed air pipe, leading to the hollow header, and as shown in Fig. 5, a tube 28 extending through each of the di-electric plugs 19 communicates the interior of the corresponding shell 12, with the interior of the header 11. Thus, the air pressure within the shell 12 may be maintained equal to the pressure inside of the still 5.

A suitable pressure gauge 29 may be installed in the line 27 and this may be compared from time to time with a pressure gauge indicating the pressure inside of the still.

It can now be seen in Fig. 2, that the valve 7 is provided with a stem 30 which connects as at 31 to the screw shaft 32. An inspection of Fig. 7 will show that the screw shaft 32 is journalled through the uprights 33—33 on the base 34. Interposed between these uprights 33—33 is the guide bar 35, sliders 36 each carrying a switch, one of which is designated by numeral 37 and the other by numeral 38.

Operated by the screw shaft 32 is the nut 39 carrying the depending fingers 40 which operates in the path of the switches 37—38. An electric motor 41 operates the shaft 32 through the reducing gears 42.

Now following the diagram shown in Fig. 8 it can be seen that as the oil flows against the paddle 15, the circuit 43 will be maintained grounded with the signal lamp 44 energized to indicate to the operator of the still that the flow is low.

When the flow is sufficient and at a sufficient level to impress the paddle 16, the circuit 45 will be grounded and this results in the energization of the signal lamp 46, indicating to the operator of the still that the flow level of the oil is substantially normal.

When the level of the oil reaches a point where the flow thereof operates against the paddle 17, the shell 12 will be flexed, this to the extent that the contact 24 will be broken and the contact 25 will be engaged. In this manner, the circuit including the switch 38 and electro-magnet 47 is opened, and it can be observed that this circuit is denoted by numeral 48.

During this last-described condition, the contacts 25 being engaged, the circuit 49 becomes grounded in which manner the electro-magnet 50 becomes energized. The operation of the motor 41 is thus reversed so that the operation thereof will rotate the screw shaft 35 and feed the finger 40 from the switch 38.

When the finger 48 abuts the switch 37, the circuit 49 will be opened; however, during this operation of the screw shaft, the valve 7 has been closed, or operated substantially toward a closed position.

In the circuit 49 is the lamp 52 which when the circuit 49 is energized, becomes illuminated to indicate the condition of the oil in the still.

Should the oil continue to rise at the failure of the motor 41 to operate or because of some other condition, the paddle 18 will be affected by the flow of oil so that the circuit 53 will be grounded. The circuit is crossed by the condenser 54 and has not only the indicating lamp 55 therein, but also some form of electric annunciator 56.

Thus, through the apparatus should it fail to operate automatically, the operator, will be provided with an audible signal as well as a visible signal, so that the still can be manually controlled before any damage ensues.

When the finger 40 carried by the nut 39 on the screw 32 engages and opens one of switches 37 or 38, and provided the units B, C, D and E have become open as a result of the return to normal level of the oil, the motor 41 will be reversed, operating the screw 32 in the reverse direction, thus leaving the switch 37 and moving in the direction of the switch 38, all the while opening the valve 7. The finger 40 will continue toward the switch 38 until the same abuts the switch, thus opening the circuit including the magnet 47 and de-energizing the motor 41. The valve is now in its normally open position and the operation of restoring the level to normal state has taken place automatically.

The motor circuits are supplied with current from a 220 volts 3 phase line.

Figs. 9 and 10 represent a modification of the shells in which the contacts operate. Numeral 12' represents the modified shell which is cylindrical throughout its entire length excepting at a point shown in Fig. 9 and denoted by numeral 13', where the shell is compressed to assume an elliptical shape, similar to the shape in the cross sectional view, Fig. 6. At this point, the shell will flex, while the remaining portions of the shell are cylindrical.

The lower portion of each shell is open and provided with threads for cooperation with the internal threads of the removable cap 14'. By removing this cap, access may be had to the contacts and contactors within the shell to permit repair and replacement as at the cleaning thereof.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

1. A circuit closer comprising a flexible casing, said casing being provided with a stationary contact therein and a contact carried by the casing, a paddle, said paddle being provided with an elongated stem and means for adjustably connecting the said stem to the casing whereby the stem can be adjusted longitudinally on the casing.

2. A circuit closer comprising a flexible casing, said casing being provided with a stationary contact therein and a contact carried by the casing, a paddle, said paddle being provided with an elongated stem and means for adjustably connecting the said stem to the casing whereby the stem can be adjusted longitudinally on the casing, said means comprising a clamp ring for circumscribing the stem and casing and a set screw through the ring for engagement against the stem whereby the stem is clamped against the casing in adjusted position.

LUTHER E. HUDGENS.